United States Patent
Cronin et al.

(10) Patent No.: US 9,760,572 B1
(45) Date of Patent: Sep. 12, 2017

(54) EVENT-BASED CONTENT COLLECTION FOR NETWORK-BASED DISTRIBUTION

(71) Applicant: ProSports Technologies, LLC, Miami, FL (US)

(72) Inventors: John E. Cronin, Bonita Springs, FL (US); Seth M. Cronin, Clarksville, TN (US); Nick Reasner, Miami, FL (US)

(73) Assignee: PROSPORTS TECHNOLOGIES, LLC, Miami, FL (US)

( * ) Notice: Subject to any disclaimer, the term of this patent is extended or adjusted under 35 U.S.C. 154(b) by 0 days.

(21) Appl. No.: 14/798,271

(22) Filed: Jul. 13, 2015

Related U.S. Application Data

(60) Provisional application No. 62/023,427, filed on Jul. 11, 2014, provisional application No. 62/047,185, filed on Sep. 8, 2014.

(51) Int. Cl.
*G06F 17/30* (2006.01)

(52) U.S. Cl.
CPC .... *G06F 17/3002* (2013.01); *G06F 17/30091* (2013.01); *G06F 17/30203* (2013.01); *G06F 17/30241* (2013.01); *G06F 17/30876* (2013.01)

(58) Field of Classification Search
CPC ............. H04N 21/422; H04N 21/4104; H04N 21/2187
See application file for complete search history.

(56) References Cited

U.S. PATENT DOCUMENTS

| | | | |
|---|---|---|---|
| 6,080,063 A * | 6/2000 | Khosla | A63F 13/10 463/42 |
| 6,144,375 A | 11/2000 | Jain et al. | |
| 6,204,813 B1 | 3/2001 | Wadell et al. | |
| 6,952,558 B2 | 10/2005 | Hardacker | |
| 7,079,176 B1 * | 7/2006 | Freeman | G03C 1/26 348/207.1 |

(Continued)

FOREIGN PATENT DOCUMENTS

| | | |
|---|---|---|
| CN | 102843186 | 12/2012 |
| EP | 2 150 057 | 12/2013 |

(Continued)

OTHER PUBLICATIONS

PCT Application No. PCT/US2015/047265 International Search Report and Written Opinion mailed Dec. 7, 2015.

(Continued)

*Primary Examiner* — Rong Le
(74) *Attorney, Agent, or Firm* — Polsinelli LLP

(57) ABSTRACT

An event, such as a sports game, may include numerous individual event occurrences, some in a performance area (e.g., a sports field or a concert stage) and some out of the performance area (e.g., in a gym or locker room). Beacons with audiovisual capture capabilities may be set up at key points within the performance area and at important areas outside the performance area in order to capture audiovisual data from various event occurrences that might be difficult to capture otherwise. The audiovisual data may be organized into an event beacon database, which may then be supplied to various other entities, such as media providers or advertisers, to provide to their constituencies, or to sports players or event performers to provide to social media followers, or to event fans to directly access via an API or web interface.

20 Claims, 10 Drawing Sheets

Event Beacon Database 360 (e.g., Sports Beacon Database 400)

| | 405 | 410 | 415 | 420 | 425 | 430 | 435 | 440 | 445 |
|---|---|---|---|---|---|---|---|---|---|
| | Active | GPS Location | ID Number | File Name | Sports Event | Date | Description | Time | Player Media ID |
| Row 1 | | | | | | | | | |
| Row 2 | Yes | 72:15 | 555 | FX.avi | Patriots vs. Broncos | 4/23/2014 | Water Cooler | 2:20pm | BR001, PA002 |
| Row 3 | Yes Completed | 72:19 | 591 | FY.avi | Patriots vs. Broncos | 4/23/2014 | Gym Training | 2:15pm | BR003 |
| Row 4 | No | 72:21 | 618 | FZ.avi | Patriots vs. Broncos | 4/23/2014 | Sponsor Event | 3:20pm | PA004 |
| | | | | | | | | | |

(56) References Cited

U.S. PATENT DOCUMENTS

| | | |
|---|---|---|
| 7,091,863 B2 | 8/2006 | Ravet |
| 7,136,042 B2 | 11/2006 | Magendanz et al. |
| 7,383,229 B2 | 6/2008 | Jacoby |
| 7,583,901 B2 | 9/2009 | Nakagawa et al. |
| 7,620,426 B2 | 11/2009 | Ortiz et al. |
| 7,715,723 B2 | 5/2010 | Kagawa et al. |
| 7,721,339 B2 | 5/2010 | Madison et al. |
| 7,734,730 B2 | 6/2010 | McCanne |
| 7,743,070 B1 | 6/2010 | Blumberg |
| 7,849,160 B2 | 12/2010 | Hayward |
| 7,884,855 B2 | 2/2011 | Ortiz |
| 8,019,227 B2 | 9/2011 | Iizuka |
| 8,042,140 B2 * | 10/2011 | Thomas ............ G06F 3/1415 725/94 |
| 8,091,111 B2 | 1/2012 | Logan et al. |
| 8,237,787 B2 | 8/2012 | Hollinger |
| 8,279,051 B2 | 10/2012 | Khan |
| 8,333,321 B2 | 12/2012 | Gressel et al. |
| 8,391,773 B2 | 3/2013 | Arseneau et al. |
| 8,408,553 B2 | 4/2013 | Eskildsen |
| 8,482,612 B2 | 7/2013 | Tamir et al. |
| 8,526,931 B1 | 9/2013 | Fraley |
| 8,538,276 B2 | 9/2013 | Shimada et al. |
| 8,588,432 B1 | 11/2013 | Simon |
| 8,589,667 B2 | 11/2013 | Mujtaba et al. |
| 8,611,930 B2 | 12/2013 | Louboutin et al. |
| 8,620,344 B2 | 12/2013 | Huang et al. |
| 8,622,832 B2 | 1/2014 | Marty et al. |
| 8,626,465 B2 | 1/2014 | Moore et al. |
| 8,630,216 B2 | 1/2014 | Deivasigamani et al. |
| 8,638,367 B1 | 1/2014 | Allen |
| 8,660,501 B2 | 2/2014 | Sanguinetti |
| 8,706,044 B2 | 4/2014 | Chang et al. |
| 8,724,723 B2 | 5/2014 | Panicker et al. |
| 8,736,681 B2 | 5/2014 | Matsuzawa |
| 8,750,207 B2 | 6/2014 | Jeong et al. |
| 8,793,094 B2 | 7/2014 | Tam et al. |
| 8,816,868 B2 | 8/2014 | Tan et al. |
| 8,831,529 B2 | 9/2014 | Toh et al. |
| 8,831,655 B2 | 9/2014 | Burchill et al. |
| 8,836,851 B2 | 9/2014 | Brunner |
| 8,843,158 B2 | 9/2014 | Nagaraj |
| 8,849,308 B2 | 9/2014 | Marti et al. |
| 8,862,060 B2 | 10/2014 | Mayor |
| 8,873,418 B2 | 10/2014 | Robinson et al. |
| 8,874,090 B2 | 10/2014 | Abuan et al. |
| 8,917,632 B2 | 12/2014 | Zhou et al. |
| 8,934,921 B2 | 1/2015 | Marti et al. |
| 9,124,729 B2 * | 9/2015 | Jung ............... H04N 1/00132 |
| 9,498,678 B2 | 11/2016 | Cronin |
| 9,571,903 B2 | 2/2017 | Cronin |
| 9,591,336 B2 | 3/2017 | Cronin |
| 9,655,027 B1 | 5/2017 | Cronin |
| 2002/0132612 A1 | 9/2002 | Ishii |
| 2002/0156835 A1 | 10/2002 | Williams et al. |
| 2003/0023595 A1 | 1/2003 | Carlbom et al. |
| 2004/0071209 A1 | 4/2004 | Burg et al. |
| 2004/0086257 A1 | 5/2004 | Werberig et al. |
| 2004/0171381 A1 | 9/2004 | Inselberg |
| 2005/0012023 A1 | 1/2005 | Vock et al. |
| 2005/0027608 A1 | 2/2005 | Wiesmuller et al. |
| 2005/0093976 A1 | 5/2005 | Valleriano et al. |
| 2005/0202905 A1 | 9/2005 | Chesser |
| 2005/0259618 A1 | 11/2005 | Ahya et al. |
| 2005/0273830 A1 | 12/2005 | Silver et al. |
| 2006/0067654 A1 | 3/2006 | Herberger et al. |
| 2007/0188611 A1 | 8/2007 | Carter |
| 2007/0188612 A1 | 8/2007 | Carter |
| 2007/0200929 A1 | 8/2007 | Conaway |
| 2008/0137507 A1 | 6/2008 | Sun et al. |
| 2008/0140233 A1 | 6/2008 | Seacat |
| 2008/0192116 A1 | 8/2008 | Tamir et al. |
| 2008/0214211 A1 | 9/2008 | Lipovski |
| 2009/0061971 A1 | 3/2009 | Weitzner et al. |
| 2009/0082110 A1 | 3/2009 | Relyea et al. |
| 2009/0171571 A1 | 7/2009 | Son et al. |
| 2010/0026809 A1 | 2/2010 | Curry |
| 2010/0043040 A1 | 2/2010 | Olsen |
| 2010/0123830 A1 | 5/2010 | Vunic |
| 2010/0245588 A1 | 9/2010 | Waehner et al. |
| 2010/0306064 A1 | 12/2010 | Inselburg |
| 2011/0014974 A1 | 1/2011 | Torf |
| 2011/0050904 A1 | 3/2011 | Anderson |
| 2011/0125809 A1 | 5/2011 | Woods et al. |
| 2011/0165946 A1 | 7/2011 | Pavlich et al. |
| 2011/0202945 A1 | 8/2011 | Pickelsimer et al. |
| 2011/0280540 A1 | 11/2011 | Woodman |
| 2011/0304737 A1 | 12/2011 | Evans et al. |
| 2012/0052949 A1 | 3/2012 | Weitzner et al. |
| 2012/0054178 A1 | 3/2012 | Tran et al. |
| 2012/0188345 A1 | 7/2012 | Salow |
| 2012/0229338 A2 | 9/2012 | Eidloth et al. |
| 2012/0296826 A1 | 11/2012 | Bergdale et al. |
| 2012/0317302 A1 | 12/2012 | Silvestri et al. |
| 2013/0126713 A1 | 5/2013 | Haas et al. |
| 2013/0141555 A1 | 6/2013 | Ganick et al. |
| 2013/0160051 A1 | 6/2013 | Armstrong et al. |
| 2013/0182117 A1 | 7/2013 | Arseneau et al. |
| 2013/0196788 A1 | 8/2013 | Shimizu et al. |
| 2013/0205341 A1 | 8/2013 | Jabara et al. |
| 2013/0208184 A1 | 8/2013 | Castor et al. |
| 2013/0268620 A1 | 10/2013 | Osminer |
| 2013/0279917 A1 | 10/2013 | Son et al. |
| 2013/0283305 A1 | 10/2013 | Hirsch et al. |
| 2013/0286212 A1 | 10/2013 | Sandler et al. |
| 2013/0300821 A1 | 11/2013 | Lankford et al. |
| 2013/0300832 A1 | 11/2013 | Hohteri et al. |
| 2013/0303192 A1 | 11/2013 | Louboutin |
| 2013/0305297 A1 | 11/2013 | Jabara et al. |
| 2013/0317835 A1 | 11/2013 | Mathew |
| 2013/0328917 A1 | 12/2013 | Zambetti et al. |
| 2013/0331087 A1 | 12/2013 | Shoemaker |
| 2013/0331118 A1 | 12/2013 | Chhabra |
| 2013/0331137 A1 | 12/2013 | Burchill |
| 2013/0332108 A1 | 12/2013 | Patel |
| 2013/0332156 A1 | 12/2013 | Tackin |
| 2013/0335520 A1 | 12/2013 | Campbell et al. |
| 2013/0336662 A1 | 12/2013 | Murayama et al. |
| 2013/0343762 A1 | 12/2013 | Murayama et al. |
| 2014/0031058 A1 | 1/2014 | Zhang et al. |
| 2014/0057658 A1 | 2/2014 | Murad et al. |
| 2014/0062773 A1 | 3/2014 | MacGougan |
| 2014/0063259 A1 | 3/2014 | Rhodus et al. |
| 2014/0065962 A1 | 3/2014 | Le |
| 2014/0071221 A1 | 3/2014 | Dave |
| 2014/0072270 A1 | 3/2014 | Goldberg et al. |
| 2014/0105084 A1 | 4/2014 | Chhabra |
| 2014/0111625 A1 | 4/2014 | Dawe et al. |
| 2014/0139380 A1 | 5/2014 | Ouyang |
| 2014/0141803 A1 | 5/2014 | Marti |
| 2014/0150042 A1 | 5/2014 | Pacor et al. |
| 2014/0161416 A1 | 6/2014 | Chou et al. |
| 2014/0162628 A1 | 6/2014 | Bevelacqua |
| 2014/0164520 A1 | 6/2014 | Fan |
| 2014/0164760 A1 | 6/2014 | Hybertson |
| 2014/0167794 A1 | 6/2014 | Nath |
| 2014/0168170 A1 | 6/2014 | Lazarescu |
| 2014/0171039 A1 | 6/2014 | Bjontegard |
| 2014/0171114 A1 | 6/2014 | Marti |
| 2014/0180820 A1 | 6/2014 | Louboutin |
| 2014/0191979 A1 | 7/2014 | Tsudik |
| 2014/0195675 A1 | 7/2014 | Silver et al. |
| 2014/0200053 A1 | 7/2014 | Balasubramanian |
| 2014/0222335 A1 | 8/2014 | Piemonte |
| 2014/0232633 A1 | 8/2014 | Shultz |
| 2014/0232634 A1 | 8/2014 | Piemonte |
| 2014/0241730 A1 | 8/2014 | Jovicic et al. |
| 2014/0247279 A1 | 9/2014 | Nicholas |
| 2014/0247280 A1 | 9/2014 | Nicholas |
| 2014/0269562 A1 | 9/2014 | Burchill |
| 2014/0274150 A1 | 9/2014 | Marti |
| 2014/0283135 A1 | 9/2014 | Shepherd |
| 2014/0293959 A1 | 10/2014 | Singh |
| 2014/0349750 A1 | 11/2014 | Thompson et al. |

(56) References Cited

U.S. PATENT DOCUMENTS

| | | |
|---|---|---|
| 2014/0363168 A1 | 12/2014 | Walker |
| 2014/0364089 A1 | 12/2014 | Lienhart |
| 2014/0364148 A1 | 12/2014 | Block |
| 2014/0365120 A1 | 12/2014 | Vulcano |
| 2014/0375217 A1 | 12/2014 | Feri et al. |
| 2015/0006648 A1 | 1/2015 | Cao |
| 2015/0007049 A1 | 1/2015 | Langlois |
| 2015/0011242 A1 | 1/2015 | Nagaraj |
| 2015/0026623 A1 | 1/2015 | Horne |
| 2015/0031397 A1 | 1/2015 | Jouaux |
| 2015/0058781 A1 | 2/2015 | Malik et al. |
| 2015/0131845 A1 | 5/2015 | Forouhar et al. |
| 2015/0189349 A1* | 7/2015 | Nelson ............... H04N 21/2668 725/28 |
| 2015/0326902 A1 | 11/2015 | Levakov et al. |
| 2016/0008662 A1 | 1/2016 | Cronin |
| 2016/0014435 A1 | 1/2016 | Cronin |
| 2016/0014481 A1 | 1/2016 | Cronin |
| 2016/0062722 A1 | 3/2016 | Cronin |
| 2016/0066159 A1 | 3/2016 | Cronin |

FOREIGN PATENT DOCUMENTS

| | | |
|---|---|---|
| WO | WO 01/41884 | 6/2001 |
| WO | WO 2004/071598 | 8/2004 |
| WO | WO 2007/035878 A2 | 3/2007 |
| WO | WO 2007/035878 A3 | 3/2007 |
| WO | WO 2009/104921 | 8/2009 |
| WO | WO 2011/137100 | 11/2011 |
| WO | WO 2013/121215 | 8/2013 |
| WO | PCT/US15/40207 | 7/2015 |
| WO | PCT/US15/40215 | 7/2015 |
| WO | PCT/US15/40223 | 7/2015 |
| WO | PCT/US15/47265 | 8/2015 |
| WO | PCT/US15/471148 | 8/2015 |
| WO | WO 2016/007962 | 1/2016 |
| WO | WO 2016/007965 | 1/2016 |
| WO | WO 2016/007967 | 1/2016 |
| WO | WO 2016/033366 | 3/2016 |
| WO | WO 2016/036571 | 3/2016 |

OTHER PUBLICATIONS

U.S. Appl. No. 14/798,286 Office Action mailed Dec. 4, 2015.
U.S. Appl. No. 14/829,184 Office Action mailed Nov. 23, 2015.
U.S. Appl. No. 14/798,314, John E. Cronin, Ball Tracker Camera, Jul. 13, 2015.
U.S. Appl. No. 14/798,286, John Cronin, Camera Feed Distribution From Event Venue Virtual Seat Cameras, Jul. 13, 2015.
U.S. Appl. No. 14/788,748, John Cronin, Sports Television Applications, Jun. 30, 2015.
U.S. Appl. No. 14/798,346, John Cronin, Ball Tracker Snippets, Jul. 13, 2015.
U.S. Appl. No. 14/798,294, John Cronin, Event Data Transmission to Eventgoer Devices, Jul. 13, 2015.
U.S. Appl. No. 14/798,296, John Cronin, Event and Fantasy League Data Transmission to Eventgoer Devices, Jul. 13, 2015.
U.S. Appl. No. 14/837,457, John E. Cronin, Multiple Display Controller System, Aug. 27, 2015.
U.S. Appl. No. 14/838,767, John E. Cronin, Automated Clip Creation, Aug. 28, 2015.
U.S. Appl. No. 14/829,184, Maxx T. Garrison, Event Media, Aug. 18, 2015.
U.S. Appl. No. 14/838,129, John E. Cronin, Current Event and Outside Event Data Transmission to Eventgoer Devices, Aug. 27, 2015.
"Anvato Announces New Cloud Solution for HD Live Streaming, Clip Editing, Social Sharing and Archival", ANVATO KNOWS/ Video, May 12, 2014.
"Aspera to Showcase Digital Media Workflow and Broadcast IT Solutions At Broadcastasia 2013", Aspera News, Jun. 4, 2013.
Barney et al., Casey; "Visible Light Communication Systems", A Major Qualifying Project Report Submitted to the Faculty of the Worchester Polytechnic Institute, Mar. 28, 2014.
"Bright Leverages Cloud to Stream Sports Content Worldwide", by Sports Video Group, Jul. 9, 2013.
"Casio Unveils Prototype of Visible Light Communication System Using Smartphones at CES", Casio Computer Co., Ltd., Jan. 10, 2012.
"Camera Corps Robotic Cameras Systems to Televise Wimbledon Action", TVTechnology, Jun. 24, 2013. http://www.tvtechnology.com/equipment/0082/camera-corps-ro . . . .
"Cisco Stadium Vision Mobile", Cisco, May 21, 2014.
Coxworth, Ben; "NFL may track footballs using magnetic fields", Gizmag.com, Jun. 13, 2014 http://www.gizmag.com/football-tracking-magnetic-fields/3254 . . . .
"Create Innovative SERVICES with PLAY APPs", Date of Download: Jan. 16, 2014, http://www.oledcomm.com/LIFI.html, Oledcomm—France LiFi.
Danakis, C et al.; "Using a CMOS Camera Sensor for Visible Light Communication"; 3rd IEEE Workshop on Optical Wireless Communications; [online], Dec. 3-7, 2012 [retrieved Aug. 14, 2015]. Retrieved from the Internet: <URL: https://195.134.65.236/IEEE_Globecom_2012/papers/p1244-danakis.pdf> pp. 1244-1248.
Davies, Chris; "Philips LED lights flicker out a challenge to iBeacon and Gimbal", SlashGear, Feb. 17, 2014.
Dawson, Keith; "LiFi in the Real World" All LED Lighting—Illuminating The Led Community, Jul. 31, 2013.
Dinh et al., Thang; "Real time tracking using an active pan-tilt-zoom network camera", Proceeding IROS '09 Proceedings of the 2009 IEEE/RSJ International conference on Intelligent robots and systems. pp. 3786-3793, 2009.
"Engaged Sports Media Selects thePlatform as Centralized Cloud-based Video Publishing System", thePlatform, Oct. 31, 2013.
"EZ Display and EZ Remote for Android—User Guide", InFocus, Jul. 10, 2013.
Fisher et al., Brian E.; "Measurements corner: Three-dimensional position and orientation measurements using magneto-quasistatic fields and complex image theory", IEEE Xplore Abstract, Antennas and Propagation Magazines, IEEE (vol. 56, Iss. 1) Feb. 2014, pp. 160-173.
"Football camera provides ball's-eye view of the field", R&D Magazine Webcast, Feb. 27, 2013.
Gaddam et al., Vamsidhar R.; "Interactive Zoom and Panning from Live Panoramic Video", Nossdav '14 Proceedings of Network and Operating Systems Support for Digital Audio and Video Workshop, Mar. 19, 2014.
Gerhardt, Ryan; "Stadium App Lets Fans Order Food and Get On-Court Close Ups", PSFK.com, Feb. 22, 2013.
"GigaBroadcasting", Li-Fi Consortium, Date of Download: Aug. 14, 2014.
Gilpin, Lyndsey; "How GE created smart lights by integrating beacons into LEDs", TechRepublic, Jun. 6, 2014.
Gorman, Michael; "Outstanding Technology brings visible light communication to phones and tablets via dongle and LEDs", Edgadget International Editions, Jul. 16, 2012.
Haas, Harald; "Delivering safe and secure wireless communications", pureLiFi. Date of download: Jan. 16, 2014 http://purelifi.co.uk/.
Hammond, Teena; "Stadiums race to digitize: How sports teams are scrambling to keep Millenials coming to games", TechRepublic. Apr. 12, 2014.
"Hybrid's Sport Track Enables Robotic Cameras to Follow Action", TVTechnology, May 29, 2013 http://www.tvtechnology.com/news/ 0086/hybrids-sport-track-en . . . .
Jaffe, Jay; "MLB unveils revolutionary next-level tracking technology on defense", The Strike Zone, Mar. 3, 2014.
Kamenetzky, Andy; "Inside The Most Connected Sports Venue in America (And, No, It Ain't Cowboys Stadium)", Digital Trends, Nov. 6, 2013.
Kaplan, Daniel; "In-game locker room video still rare around NFL", SportsBusiness Journal, Sep. 30, 2013.
Kappeler et al., Uwe-Philipp; "3D Object Localizationi via Stereo Vision using an Omnidirectional and a Perspective Camera", Pro-

(56) References Cited

OTHER PUBLICATIONS ceedings of the 2nd. Workshop on Omindirectional Robot Vision. May 7, 2010. ISBN 978-88-95872-02-5 pp. 7-12.
Keith Price Bibliography Sports, Line Judge, Ball Position, Ball Tracking and Enhanced Displays, VisionBib. Date of download: Apr. 24, 2014 http://www.visionbib.com/bibliography/motion-f746ba1.html.
Kumar, Navin; "Visible Light Communications Systems Conception and VIDAS", IETE Technical Review, vol. 25, Issue 6, Nov.-Dec. 2008. Date of download: Nov. 19, 2009. http://www.tr.ietejournals.org.
Lavars, Nick; "Adidas miCoach Smart Ball tracks your striking power and finesse", Gizmag.com, May 28, 2014 http://www.gizmag.com/adidas-micoach-smart-soccer-ball/3228 . . . .
LiFi Overview—Green wireless mobile communication—LiFi Technology. Date of download: Jan. 16, 2014.
Li, Yang et al., "VICO: A Framework for Configuring Indoor Visible Light Communication Networks" Aug. 11, 2012, Mobile Adhoc and Sensor Systems (MASS), 2012 IEEE 9th International Conference, Las Vegas, NV.
"Manchester City's Etihad Stadium is soon to be transformed into the Premier League's most technologically fan-friendly stadium", Machester City, May 8, 2013.
Montero, Eric, "Design and Implementation of Color-Shift Keying for Visible Light Communications", Sep. 2013, McMaster University.
Nguyen et al., "A Novel like switching scheme using pre-scanning and RSS prediction in visible light communication networks", EURASIP Journal on Wireless Communications and Networking, 2013.
Ogawa; "Article about VLC Guidance developed", Visible Light Communications Consotium (VLCC), Aug. 31, 2012.
Ogawa; "iPhone app from CASIO", Visible Light Communications Consortium (VLCC), Apr. 26, 2012.
Pawate et al., Raj; "Remote display technology enhances the cloud's user experience", Texas Instruments, Aug. 2012.
Pingali et al., Gopal' "Lucentivision: Converting Real World Events Into Multimedia Experiences", Multimedia and Expo, 2000. ICME 2000. 2000 IEEE International Conference on vol. 3, Jul. 30, 2000—Aug. 2, 2000.
Povey, Gordon, "VLC for Location, positioning and navigation", Jul. 27, 2011, http://visiblelightcomm.com/vlc-for-location-positioning-and-n . . . .
"Proprietary Data Is Foundational", Contextual Database| Delivery Agent, Inc. Date of Download: Apr. 30, 2014 http://www.deliveryagent.com/products/contextual-database/.
RedFIR Precision Real-Time Tracking, Fraunhofer Institute for Integrated Circuits IIS. Oct. 7, 2015.
Ren et al., Jinchang; "A General Framework for 3D Soccer Ball Estimation and Tracking", Image Processing, 2004. ICIP '04. 2004 International Conference on (vol. 3) Date of Conference: Oct. 24-27, 2004.
Rufo et al., J.; "Visible Light Communication Systems for Optical Video Transmission", Microwave and Optical Technology Letters, vol. 52, No. 7, Jul. 2010.
"Streaming Video Online Databases", MLibrary, University of Michigan. Maintained by: Clara Slavens, last modified: Apr. 17, 2014.
"Surveillance Monitoring—Networking Security—PTZ Network Cameras", Panasonic USA. http://www.panasonic.com/business/psna/products/surveillance-monitoring/network-security-cameras/ptz-cameras.aspx Date of Download: Apr. 29, 2014.
Swedberg, Claire; "RFID Helps Soccer Teams Keep Their Eye on the Ball, and Their Players", RFID Journal, Mar. 13, 2012.

Thanigavel, M.; "Li-Fi Technology in Wireless Communication", International Journal of Engineering Research & Technology (IJERT), ISSN: 2278-0181, vol. 2 Issue 10, Oct. 2013.
Wells, Alton; "How would you build a gimball system that could track any point within a 360 degree "sphere"", AskEngineers. Posted on Aug. 26, 2013.
Wiedeman, Reeves; "Sporting Kansas City Makes the Stadium More Like Your Couch", BloombergBusinessweek, Jul. 18, 2013.
Woodward, Alexander; Delmas, Patrice; "Computer Vision for Low Cost 3-D Golf Ball and Club Tracking", CITR, University of Auckland, Dept. Computer Science, New Zealand.Date of Download: Apr. 29, 2014.
Won, Eun Tae; "Visible Light Communication: Tutorial", Project: IEEE P802.15 Working Group for Wireless Personal Area Networks (WPANs), Mar. 9, 2008.
"World Cup 2014: Goalline technology TV process reviewed", BBC Sport, Jun. 16, 2014. http://www.bbc.com/sport/0/football/27864393.
Yan, Fei; "Tennis Ball Tracking for Automatic Annotation of Broadcast Tennis Video", Centre for Vision, Speech and Signal Processing, School of Electronics and Physical Sciences, Jun. 2007.
Yu, Shuang; "Automatic Basketball Tracking in Broadcast Basketball Video", A Thesis submitted in partial fulfillment of the requirements for the Degree of Master of Science in the Faculty of Graduate Studies. Aug. 2012.
PCT Application No. PCT/US2015/033613 International Search Report and Written Opinion mailed Sep. 1, 2015.
PCT Application No. PCT/US2015/040207 International Search Report and Written Opinion mailed Oct. 5, 2015.
PCT Application No. PCT/US2015/040215 International Search Report and Written Opinion mailed Sep. 29, 2015.
PCT Application No. PCT/US2015/040223 International Search Report and Written Opinion mailed Oct. 1, 2015.
U.S. Appl. No. 14/788,748 Office Action mailed Nov. 5, 2015.
U.S. Appl. No. 14/798,294 Office Action mailed Nov. 2, 2015.
U.S. Appl. No. 14/838,129 Office Action mailed Oct. 29, 2015.
U.S. Appl. No. 14/798,346 Office Action mailed Dec. 18, 2015.
U.S. Appl. No. 14/798,286 Final Office Action mailed Jun. 8, 2016.
U.S. Appl. No. 14/788,748 Final Office Action mailed May 26, 2016.
U.S. Appl. No. 14/798,346 Final Office Action mailed Jun. 30, 2016.
U.S. Appl. No. 14/798,294 Final Office Action mailed May 13, 2016.
U.S. Appl. No. 14/838,129 Final Office Action mailed Jun. 10, 2016.
U.S. Appl. No. 14/798,296 Final Office Action mailed Sep. 13, 2016.
U.S. Appl. No. 14/837,457 Final Office Action mailed Aug. 23, 2016.
U.S. Appl. No. 14/838,767 Final Office Action mailed Aug. 25, 2016.
U.S. Appl. No. 14/829,184 Office Action mailed Sep. 12, 2016.
U.S. Appl. No. 14/798,294 Office Action mailed Oct. 4, 2016.
PCT Application No. PCT/US2015/047148 International Search Report and Written Opinion mailed Dec. 17, 2015.
U.S. Appl. No. 14/798,296 Office Action mailed Apr. 5, 2016.
U.S. Appl. No. 14/837,457 Office Action mailed Feb. 16, 2016.
U.S. Appl. No. 14/838,767 Office Action mailed Feb. 16, 2016.
U.S. Appl. No. 14/829,184 Final Office Action mailed Mar. 21, 2016.
U.S. Appl. No. 14/788,748 Office Action mailed Mar. 23, 2017.
U.S. Appl. No. 14/837,457 Office Action mailed Mar. 20, 2017.
U.S. Appl. No. 14/829,184 Final Office Action mailed Mar. 1, 2017.
U.S. Appl. No. 14/838,767 Office Action mailed Jan. 3, 2017.

* cited by examiner

Event Beacon Database 360 (e.g., Sports Beacon Database 400)

| | Active 405 | GPS Location 410 | ID Number 415 | File Name 420 | Sports Event 425 | Date 430 | Description 435 | Time 440 | Player Media ID 445 |
|---|---|---|---|---|---|---|---|---|---|
| Row 1 | Yes | 72:15 | 555 | FX.avi | Patriots vs. Broncos | 4/23/2014 | Water Cooler | 2:20pm | BR001, PA002 |
| Row 2 | Yes Completed | 72:19 | 591 | FY.avi | Patriots vs. Broncos | 4/23/2014 | Gym Training | 2:15pm | BR003 |
| Row 3 | No | 72:21 | 618 | FZ.avi | Patriots vs. Broncos | 4/23/2014 | Sponsor Event | 3:20pm | PA004 |
| Row 4 | | | | | | | | | |

*FIG. 4A*

Player Database 330

| Player Media ID | Player | Social Media | File Name | Date And Time | Likes | Shares | Comments | |
|---|---|---|---|---|---|---|---|---|
| BR001 | Bronco QB | Facebook 128 | PIC.JPEG | 4/23/2014, 2:20pm | 10 | 5 | 5 | |
| PA002 | Patriot DB | Twitter 126 | VID.MOV | 4/23/2014, 2:20pm | - | - | - | |
| BR003 | Bronco WR | Instagram, Facebook 28 | TRAN.JPEG | 4/23/2014, 2:15pm | 10 | 2 | 2 | |

Row 5
Row 6
Row 7
Row 8

FIG. 4B

Computer system 900

EVENT-BASED CONTENT COLLECTION FOR NETWORK-BASED DISTRIBUTION

CROSS-REFERENCE TO RELATED APPLICATIONS

The present application claims the priority benefit of U.S. provisional application No. 62/023,427 filed Jul. 11, 2014 entitled "Content Collection For Sports Excitement," as well as U.S. provisional application No. 62/047,185 filed Sep. 8, 2014 entitled "Content Collection For Sports Excitement Insert To Social Media," the disclosures of which are hereby incorporated by reference.

BACKGROUND

Field of Invention

The present invention generally relates to audiovisual content collection and distribution. More specifically, the present invention relates to event-based multi-source audiovisual content collection, transmission to a centralized processing system, and distribution to media, advertisers, social networking platforms, and individuals.

Description of the Related Art

Larger events, such as concerts or sporting events, are typically held in larger event venues, such as stadiums. Typically, event venues include a performance area, such as a sport field, or a sport arena, or a sport court, or a concert stage, or a lecture stage. Sometimes, cameras are set up in the performance area to capture sports play from predetermined angles. Typically, event venues include an eventgoer area, such as stadium seating, bleachers, theater seating, or a standing room eventgoer area. Typically, some parts of the eventgoer area provide better views or better acoustics of parts of events occurring within the performance area than other parts of the eventgoer area. Some portions of an event (e.g., sport team "huddle" meetings), even though they occur at the performance area, might not normally be visible or audible to the eventgoer area at all. Other occurrences, such as gym practice or training, occurs outside of the performance area and is also not seen normally be visible or audible to the eventgoer area at all.

Traditionally, the field of digital communications includes wired and wireless transfer of information. Digital communications may include direct communications in which information is transmitted from a sender device to a recipient device, and may also include "indirect" communications in which information is transmitted from a sender device, through one or more "intermediary" or "middleman" devices, and eventually to a recipient device.

One example of wired transfer includes data transmitted from a sender device to a recipient device using a Universal Serial Bus (USB) cable. Another example of a wired transfer includes data transmitted within a private Local Area Network (LAN) from a sender device to a router through a sender Ethernet cable, and from the router to a recipient device through a recipient Ethernet cable.

One example of wireless transfer includes data transmitted from a sender device to a recipient device using a Bluetooth protocol connection. Another example of a wireless transfer includes data transmitted within a private Wireless Local Area Network (WLAN) from a sender device to a router through a wireless Wi-Fi connection, and from the router to a recipient device through a wireless Wi-Fi connection. Another example of wireless transfer is Visible Light Communication (VLC).

Traditional wireless communications may be received and read by any recipient device within a range in which information transmitted wirelessly by a sender device can be interpreted. In some cases, information transmitted wirelessly by a sender may be within range of an unintended recipient.

Advertising a brand, a product, or a service is often an effective means for a business to obtain new customers and reinforce loyalty in existing customers. Advertising can be particularly effective if targeted at the correct audience, such as when a sport fan is told that buying a particular product will support his/her favorite team. Often, seating at sport stadiums during sporting events is divided into "sections" devoted to fans of one of the teams playing.

Advertising can be a particularly useful source of revenue during sporting events, such as football games. By using advertising, revenues may be raised, the cost of tickets may be brought down, and more fans may be allowed to go to a particular sports game.

Thus, a means of audiovisual content collection and distribution is needed.

SUMMARY OF THE CLAIMED INVENTION

One exemplary method for event-based content collection includes receiving an audiovisual data file from a beacon device, the audiovisual data file recorded by the beacon device. The method also includes receiving location data from the beacon device, the location data identifying a geographical location of the beacon device. The method also includes receiving time data from the beacon device, the time data identifying a time associated with the recording of the audiovisual data file. The method also includes generating a database entry in an event beacon database, the database entry including at least the audiovisual data file, the location data, and the time data. The method also includes supplying access to at least a subset of the event beacon database to a viewer device.

One exemplary system for event-based content collection includes a beacon device including an audiovisual collector device and a cloud content system. Execution of instructions stored in a memory of the cloud content system by a processor of the cloud content system performs various system operations. The system operations include receiving an audiovisual data file from the beacon device, the audiovisual data file recorded by the beacon device. The system operations also include receiving location data from the beacon device, the location data identifying a geographical location of the beacon device. The system operations also include receiving time data from the beacon device, the time data identifying a time associated with the recording of the audiovisual data file. The system operations also include generating a database entry in an event beacon database, the database entry including at least the audiovisual data file, the location data, and the time data. The system operations also include supplying access to at least a subset of the event beacon database to a viewer device.

One exemplary non-transitory computer-readable storage medium is also described, the non-transitory computer-readable storage medium having embodied thereon a program executable by a processor to perform an exemplary program method for event-based content collection that includes receiving an audiovisual data file from a beacon device, the audiovisual data file recorded by the beacon device. The program method also includes receiving location data from the beacon device, the location data identifying a geographical location of the beacon device. The program method also includes receiving time data from the beacon device, the time data identifying a time associated with the recording of the audiovisual data file. The program method also includes generating a database entry in an event beacon database, the database entry including at least the audiovisual data file, the location data, and the time data. The program method also includes supplying access to at least a subset of the event beacon database to a viewer device.

BRIEF DESCRIPTION OF THE DRAWINGS

FIG. 4A illustrates an exemplary sports beacon database.

FIG. 4B illustrates an exemplary player database.

DETAILED DESCRIPTION

An event, such as a sports game, may include numerous individual event occurrences, some in a performance area (e.g., a sports field or a concert stage) and some out of the performance area (e.g., in a gym or locker room). Beacons with audiovisual capture capabilities may be set up at key points within the performance area and at important areas outside the performance area in order to capture audiovisual data from various event occurrences that might be difficult to capture otherwise. The audiovisual data may be organized into an event beacon database, which may then be supplied to various other entities, such as media providers or advertisers, to provide to their constituencies, or to sports players or event performers to provide to social media followers, or to event fans to directly access via an API or web interface.

Figure 1:
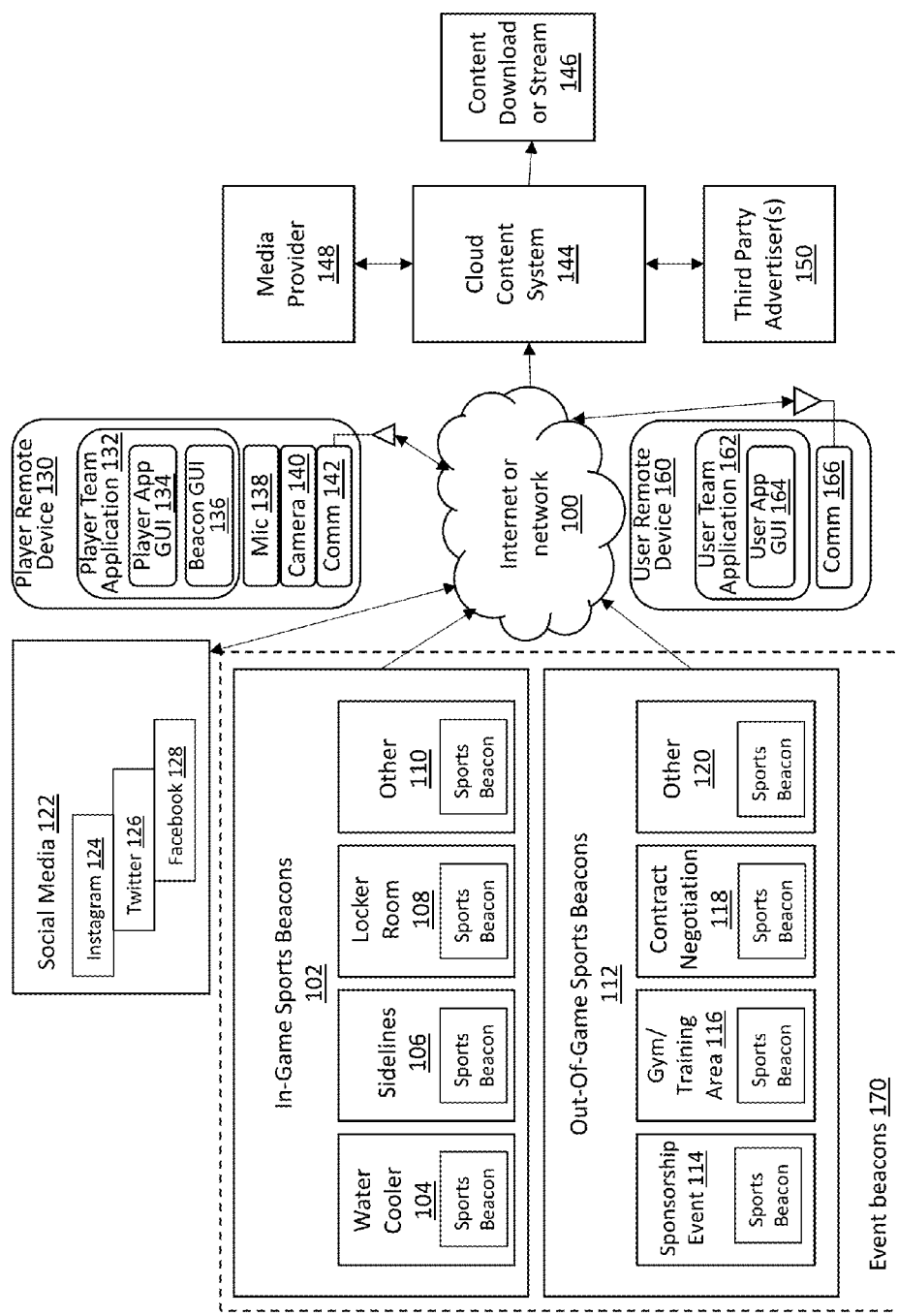
FIG. 1 illustrates an exemplary network-connected event beacon ecosystem.

FIG. 1 illustrates an exemplary network-connected event beacon ecosystem. In particular, the ecosystem is centered on various connections through the internet/network 100, that is, through the public internet or through a private network such as a local area network (LAN) or wireless local area network (WLAN) or municipal area network (MAN) or wide area network (WAN).

The ecosystem also includes multiple event beacons 170. The set of event beacons 170 of FIG. 1 are sport-related, and thus might be used at a sporting event, but other types of event beacons 170 may be used for other types of events. For example, the event beacons 170 may be used with any type of entertainment or cultural events that are presented at a theater, gymnasium, church, stadium, or other facility to a group of people. Such events include a wide variety of sporting events such as football (American and Global), baseball, basketball, soccer, ice hockey, lacrosse, rugby, cricket, tennis, track and field, golf, cycling, motor sports such as automobile or motorcycle racing, horse racing, Olympic games, and the like; cultural events such as concerts, music festivals, plays, or the opera, and the like; religious events; and more permanent exhibitions such as a museum, historic home, and the like.

The event beacons 170 of FIG. 1 are divided into two groups, namely the in-game sports beacons 102 and the out-of-game sports beacons 112.

The in-game sports beacons 102 can be used to collect audiovisual data (e.g., images, video, audio, or some combination thereof) from various locations during a sports game, such as at a water cooler 104 (e.g., to see and/or overhear casual player and coach casual conversations), at the sidelines 106 (e.g., to see and/or overhear strategies discussed by sidelined players and/or by coaches), at a locker room 108 (e.g., to see and/or overhear motivational or strategy discussions before a game or during the game or after the game), or other locations 110 associated with the play duration of the sports game. An event beacon can also be attached to a moving object, such as an unmanned aerial vehicle (UAV), a coach/trainer, or a sports player.

The out-of-game sports beacons 112 can be used to collect audiovisual data (e.g., images, video, audio, or some combination thereof) from various locations outside of the play duration of a sports game but still relevant to the sports game, such as at a sponsorship event 114 (e.g., to see and/or hear about charities motivating players/coaches/teams or about awards), at a gym/training area 116 (e.g., to see and/or hear how players and teams progress), a contract negotiation 118 (e.g., to see and/or hear about changes in the rosters of players and/or coaches making up one or more teams), or other locations 120 relevant to the sports game.

The individual event beacons 170 may include a variety of sensors (e.g., microphones, visible light cameras, night vision cameras, thermal cameras). The individual event beacons 170 may communicate audiovisual data through a wired or wireless communication module 240 as described in FIG. 2.

The audiovisual data that is obtained from the event beacons 170 is then sent through the internet/network 100 to a cloud content system 144. The cloud content system 144 may be any type of computer system 900 (e.g., which may be a physical machine or a virtual machine), or may include multiple computer systems 900 connected in a network (e.g., a local area network or wireless local area network), or may include multiple computer systems 900 distributed throughout the Internet, or may include some combination thereof. The cloud content system 144 may receive data from one or more of the event beacons 170 using a wired or wireless communication module 310 as described in FIG. 3, and ingest the data, encode the data (e.g. it may convert the data into a different format), and package the data (e.g., into an archive file with other data files) for further delivery.

The cloud content system 144, once it receives a dataset from one or more of the event beacons 170, may distribute the data to a media provider 148 (e.g., an individual or entity communicating event-related information to the public or to a private group using a communication medium such as television, radio, internet streams, podcasts, blogs, feeds, newspapers, or magazines) unprompted or in response to data requests. The cloud content system 144 may also distribute the data to a third-party advertiser 150 (e.g., an individual or entity that uses information about consumer preferences and habits in order to provide advertisements using a medium such as television, radio, internet streams, podcasts, blogs, feeds, newspapers, or magazines). The cloud content system 144 may also distribute the data directly to user devices (e.g., user remote device 160) through a content download or stream 146 hosted at the cloud content system 144 or a system communicatively connected to the cloud content system 144 (e.g., to be made accessible through a website, a blog, a desktop software application, a mobile software application, or some combination thereof).

The audiovisual data may also be uploaded to one or more social media platforms 122 (e.g., Instagram 124, Twitter 126, or Facebook 128), either directly from the event beacons 170, or by first passing through the cloud content system 144 (e.g., the social media platform 122 may be treated as a media provider 148 or a medium for a content download/stream 146).

Each media provider 148 or third-party advertiser 150 may filter or edit the audiovisual data provided by the Cloud content system 144 before transmitting it to their respective constituents (e.g., user remote device 160, another computer device, a television, a home entertainment system or video game console).

The ecosystem of FIG. 1 also includes a player remote device 130. The player remote device 130 may be used, for example, by a sports player or another type of event performer (e.g., a political speaker, an artist at a concert) to receive audiovisual data at a communication module 142 either directly from the event beacons 170 or from the event beacons 170 via the cloud content system 144 (e.g., the player remote device 130 may be treated as a media provider 148 or a medium for a content download/stream 146). The player remote device 130 may also include a microphone 138 and a camera 140, and a memory (not pictured) storing a player team application 132 to be executed by a processor (not pictured) to display a player application graphical user interface (GUI) 134 and a beacon GUI 136.

The ecosystem of FIG. 1 also includes a user remote device 160. The player remote device 130 may be used, for example, by an eventgoer or an event follower (e.g., a sports fan) to receive audiovisual data at a communication module 166 either directly from the event beacons 170 or from the event beacons 170 via the cloud content system 144 (e.g., the user remote device 160 may be treated as a media provider 148 or a medium for a content download/stream 146). The user remote device 160 may also include a microphone (not pictured) and a camera (not pictured), and a memory (not pictured) storing a user team application 162 to be executed by a processor (not pictured) to display a user application graphical user interface (GUI) 164.

Figure 2:
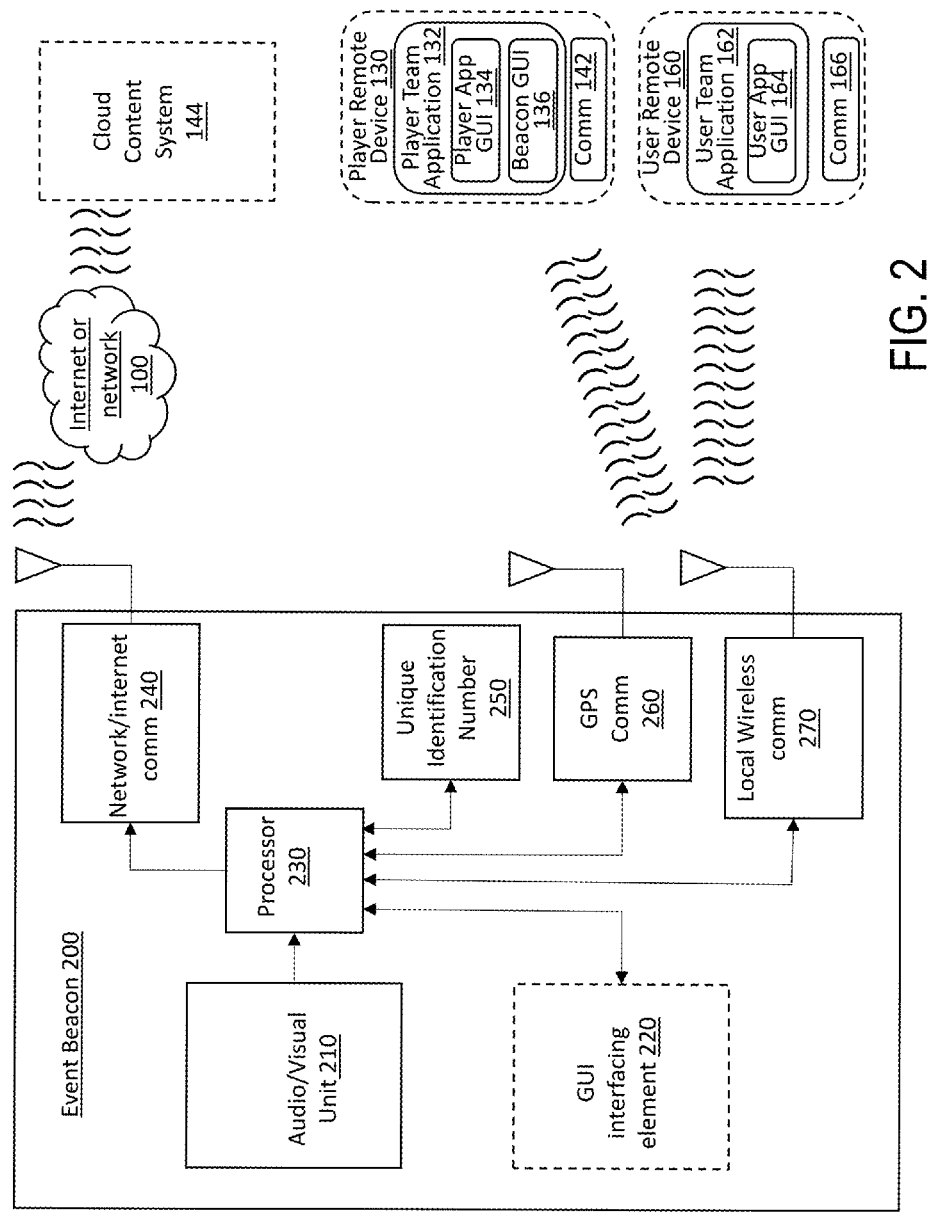
FIG. 2 illustrates an exemplary event beacon.

FIG. 2 illustrates an exemplary event beacon. The exemplary event beacon 200 may be one of the sport event beacons 170, or may be a different event beacon for a non-sporting event.

The event beacon 200 may be a computer system 900, or may be a more pared-down computerized device that includes a subset of the elements of a full computer system 900. The event beacon 200 may include a processor 230, which may be any type of processor 910. The event beacon 200 may include a memory (not shown), which may be any type of memory 920, any type of mass storage system 930, any type of portable storage system 940, or some combination thereof. The memory may optionally store software to be executed by the processor 230.

The event beacon 200 may include an audio/visual unit 210, which may include one or more cameras (photographic cameras, video cameras, night vision cameras, thermal cameras), one or more microphones, one or more various sensors (e.g., thermometer, air humidity sensor, air pollution sensor, air pollen/allergen sensor, wind sensor, altitude sensor), or some combination thereof. Any data collected by any part of the audio/visual unit 210 may be incorporated into the audiovisual data that is ultimately sent out by the event beacon 200.

The event beacon 200 may include a unique identification number 250, which may be used to identify the beacon in the sports beacon database 360 (e.g., see "ID Number" column 415 in the exemplary sports beacon database 360 of FIG. 4A).

The event beacon 200 may include a GUI interfacing element 220, which may be a hardware element, a software element executed by the processor 230, or some combination thereof, and may be used to interface with the beacon GUI 136 of the team application 132 of the player remote device 130. It may also optionally be used to interface directly with the player app GUI 134, the user app GUI 164, or an optional on-beacon GUI (not shown) located on the event beacon 200 itself.

The event beacon 200 may also include a global positioning system (GPS) communication module (comm) 260, which may communicate with one or more global positioning system (GPS) satellites to determine the geographical location of the event beacon 200. The event beacon 200 can then transmit location data including the geographical location as part of its transmitted audiovisual data (e.g., as metadata) or alongside its transmitted audiovisual data.

The event beacon 200 may also include a local wireless communication module (comm) 270, which may be used to communicate wirelessly with nearby devices. The local wireless comm 270 may include, for example, a Bluetooth (e.g., regular, smart, or low-power) connection module, a Wi-Fi direct connection module, a radio/microwave communication module, a visible light communication (VLC) module, a radio frequency identification (RFID) module (e.g., active or passive), a sonic communication module (e.g., audible sound, ultrasonic sound, infrasonic sound), or some combination thereof. The local wireless comm 270 may be used to communicate with the cloud content system 144 if it or a proxy system are located close by, or may be used to communicate directly with the player remote device 130 (e.g., via the comm 142) or with the user remote device 160 (e.g., via the comm 160).

The event beacon 200 may also include a communication module (comm) to connect to the network or internet 240, which allows the event beacon 200 to connect to a network or the internet 100. The comm 240 may include a wired communication module, which may include, for example, an Ethernet port, a modem port, a fiber optic cable port, a modem port, or a proprietary data transfer cable port. The comm 240 may include a wireless communication module, which may include, for example, a Wi-Fi connection module, or an EDGE/3G/4G/LTE cellular connection module.

The comm 142 of the player remote device 130 and the comm 166 of the user remote device 160 may include any of the communication modules listed above in relation to the network comm 240, the GPS comm 260, and the local wireless comm 270. The player remote device 130 and user remote device 160 may be any type of computing system 900, and may be, for example, a smartphone, a laptop, a portable media player device, a portable video game console, or a portable e-book reader device.

Figure 3:
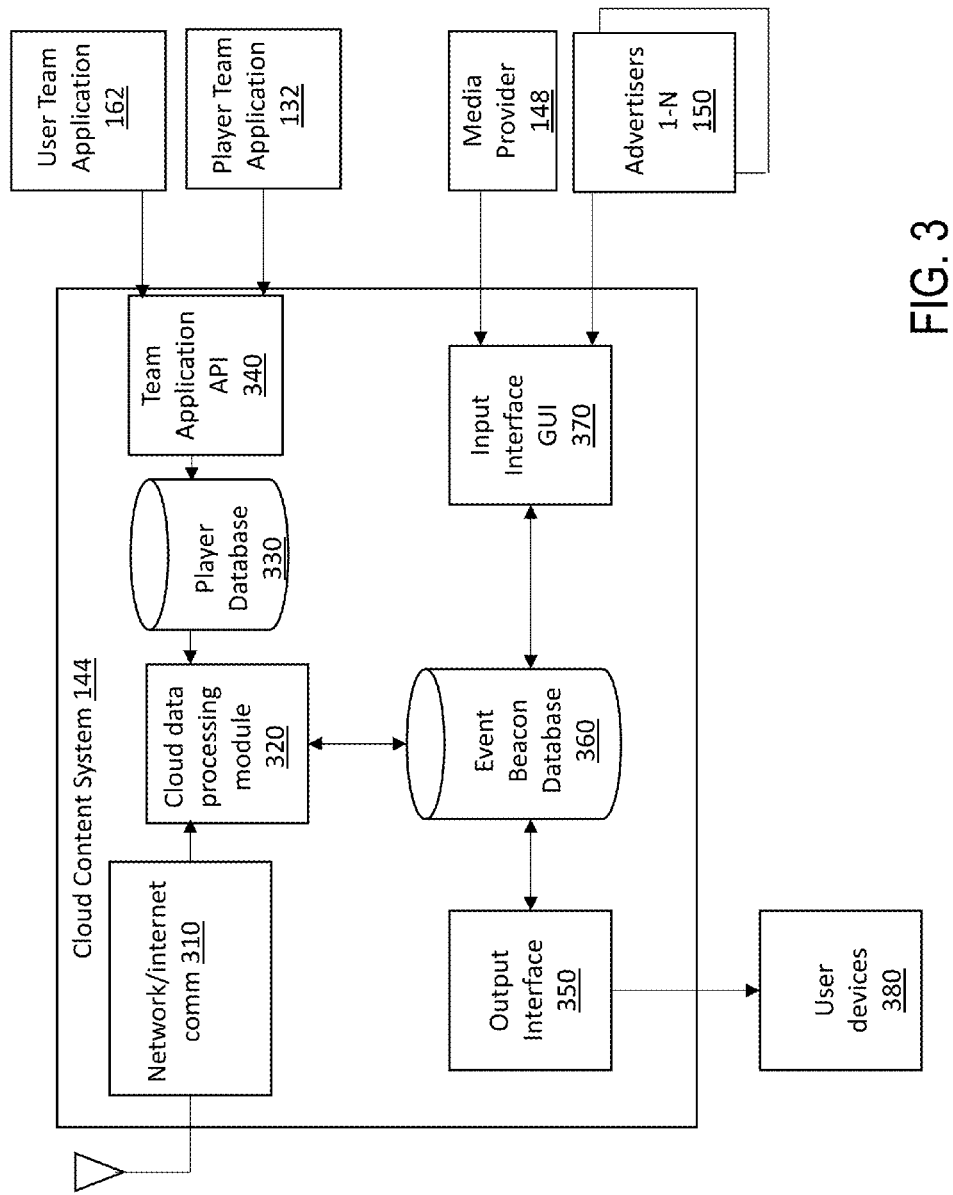
FIG. 3 illustrates an exemplary cloud content system.

FIG. 3 illustrates an exemplary cloud content system.

The cloud content processor 144 of FIG. 3 includes a network/internet comm module 310 to connect to the network or internet 100, which may include a wired communication module, which may include, for example, an Ethernet port, a modem port, a fiber optic cable port, a modem port, or a proprietary data transfer cable port. The network/internet comm module 310 may include a wireless communication module, which may include, for example, a Wi-Fi connection module, or an EDGE/3G/4G/LTE cellular connection module.

The cloud content processor 144 may use the network/internet comm module 310 to receive the audiovisual data from the event beacons 170 (e.g., from the event beacon 200). The cloud content processor 144 can then feed the audiovisual data from the event beacons 170 into the cloud data processing module 320. The cloud data processing module 320 may include hardware (e.g., a processor 910), software, or some combination thereof. The cloud content processor 144 may receive and interpret the audiovisual data (e.g., decode video data), parse the audiovisual data (e.g., to determine what is being shown or discussed using speech recognition and/or facial/text/number recognition and/or computer vision techniques), edit the audiovisual data (e.g., to crop or resize images/video or to cut out irrelevant or empty stretches of time). Parsing and editing may also include detecting and bleeping out swearwords, or highlighting comments about brands associated with advertisers 150.

The cloud data processing module 320 can also receive data from, and provide data to, an event beacon database 360, which may be a sport beacon database 400 as illustrated in FIG. 4A. The event beacon database 360 may identify particular audiovisual data files from various event beacons 170 (e.g., after and/or before processing by the cloud data processing module 320), and may also identify other data relevant to the event.

The event beacon database 360 may then be accessed through an input interface GUI 370 (e.g., an internet website, an intranet network portal, or a mobile/desktop application communicating with the cloud content system through an application programming interface), through which a media provider 148 and/or an advertiser 150 may access the audiovisual data of the event beacon database 360.

The event beacon database 360 may also be output through an output interface 350, to one or more user devices 380. The output interface 350 may be an interactive interface (e.g., an internet website, an intranet network portal, or a mobile/desktop application communicating with the cloud content system through an application programming interface) or may be a direct event venue audiovisual output (e.g., the audiovisual data may be played through speakers and displayed on a screen within the event arena, as in a "jumbotron" device) or may be a local wireless transmission at the event (e.g., Bluetooth, WiFi-Direct) to eventgoer's mobile devices 160.

In sports event situations, the cloud content system 144 may also include a player database 330 identifying individual sports players and identifying audiovisual data that includes those identified individual sports players (e.g., see exemplary player database 330 of FIG. 4B). The player database 330 may be accessed by a player remote device 130 of a player or, in some cases, by a user remote device 160 of a user (e.g., an eventgoer or a sports fan). The player database 330 may be accessed by these devices via a network-based interface (e.g., an internet website, an intranet network portal) (not shown). The player database 330 may alternately be accessed by these devices via a team application programming interface (API) 340 that allows access to the player database 330 to software applications such as a player team application 132 of the player remote device 130 or via a user team application 162 of the user remote device 160.

FIG. 4A illustrates an exemplary sports beacon database.

The exemplary sports beacon database 400 of FIG. 4A. The sports beacon database 400 of FIG. 4A is a type of event beacon database 360, and identifies individual event beacons 170 and individual audiovisual data files generated by the event beacons 170 and the cloud processing module 320. In FIG. 4A, one audiovisual data files is identified per event beacon 200, but in other cases, each event beacon 200 of the event beacons 170 may generate multiple audiovisual data files, and the event beacon database 360 may be organized, for example, by either an entry per event beacon 200 or an entry per audiovisual file.

The exemplary sports beacon database 400 of FIG. 4A includes multiple columns identifying different categories or types of information. For example, the sports beacon database 400 includes an "ID Number" column 415 identifying a unique identification number 250 of multiple event beacons 170. The sports beacon database 400 includes a "Description" column 435 identifying the location of each event beacon identified in column 415 (e.g., water cooler 104, gym training 116, sponsor event 114) or some other descriptor word or phrase. The sports beacon database 400 includes an "active" column 405 identifying whether each event beacon identified in column 415 in question is active or not, and which may also identify if each event beacon has completed its objective (e.g., once gym training is over and a game has begun, the gym training 116 event beacon 591 of row 3 has completed its objective).

The sports beacon database 400 includes a "GPS location" column 410 identifying a GPS-determined location (e.g., latitude and longitude) for each event beacon identified in column 415. The sports beacon database 400 includes a "file name" column 420 identifying an audiovisual file (or multiple audiovisual files) generated by each event beacon identified in column 415 (e.g., with or without editing/processing by the cloud data processing module 320). The sports beacon database 400 includes a "sports event" column 425 identifying an event (e.g., Patriots vs. Broncos sports game) associated with each event beacon identified in column 415. The sports beacon database 400 includes a "date" column 430 identifying a date of the identified in column 425. The sports beacon database 400 includes a "time" column 440 identifying an time (e.g., a recording-beginning time, a recording-ending time, a transmission time, a processing time) associated with each event beacon identified in column 415 and in particular associated with the audiovisual file(s) identified in column 420. The sports beacon database 400 includes a "player media ID" column 445 identifying one or more sports players (e.g., or other "event performers" such as a musical artist or a sports coach or a political speaker) identified within the audiovisual file(s) identified in column 420 or otherwise associated with each event beacon identified in column 415. The players are identified using, for example, an alphanumeric code.

FIG. 4B illustrates an exemplary player database.

The player database 330 of FIG. 4B includes multiple columns identifying different categories or types of information. In particular, the player database 330 includes a "player media ID" column 450 that identifies a particular sports player (e.g., or other "event performer" such as a musical artist or a sports coach or a political speaker) using, for example, an alphanumeric code. The player database 330 also includes a "player" column 455 that identifies a position of that player (e.g., "Bronco" team quarterback or QB, "Patriot" team defensive back or DB, "Bronco" team wide receiver or WR). The player database 460 also includes a "social media" column 460 that identifies social media platforms (e.g., Facebook 128, Twitter 126, Instagram 124) associated with the player identified in column 450 (e.g., social media platforms that the identified player uses). The player database 330 also includes a "file name" column 465 that identifies a file name of a particular data file associated with the player identified in column 450 (e.g., an image or video of the player training/playing/resting), which may for example be an image/video that the player has posted or intends to post on the social media platform(s) identified in column 460.

The player database 330 also includes a "date and time" column 470 that identifies a date and time associated with the file identified in column 465 (e.g., a date an time that the audiovisual recording was recorded, a date and time when it was processed by the cloud processing module 320, a date and time when it was uploaded into the event beacon database 360 or player database 330, or a date and time when it was uploaded to a social media platform). The player database 330 also includes a "likes" column 475, a "shares" column 480, and a "comments" column 485 that identify "likes," shares, and comments of the audiovisual data associated with the file identified in column 465 via the social media platform(s) identified in column 460.

Figure 5:
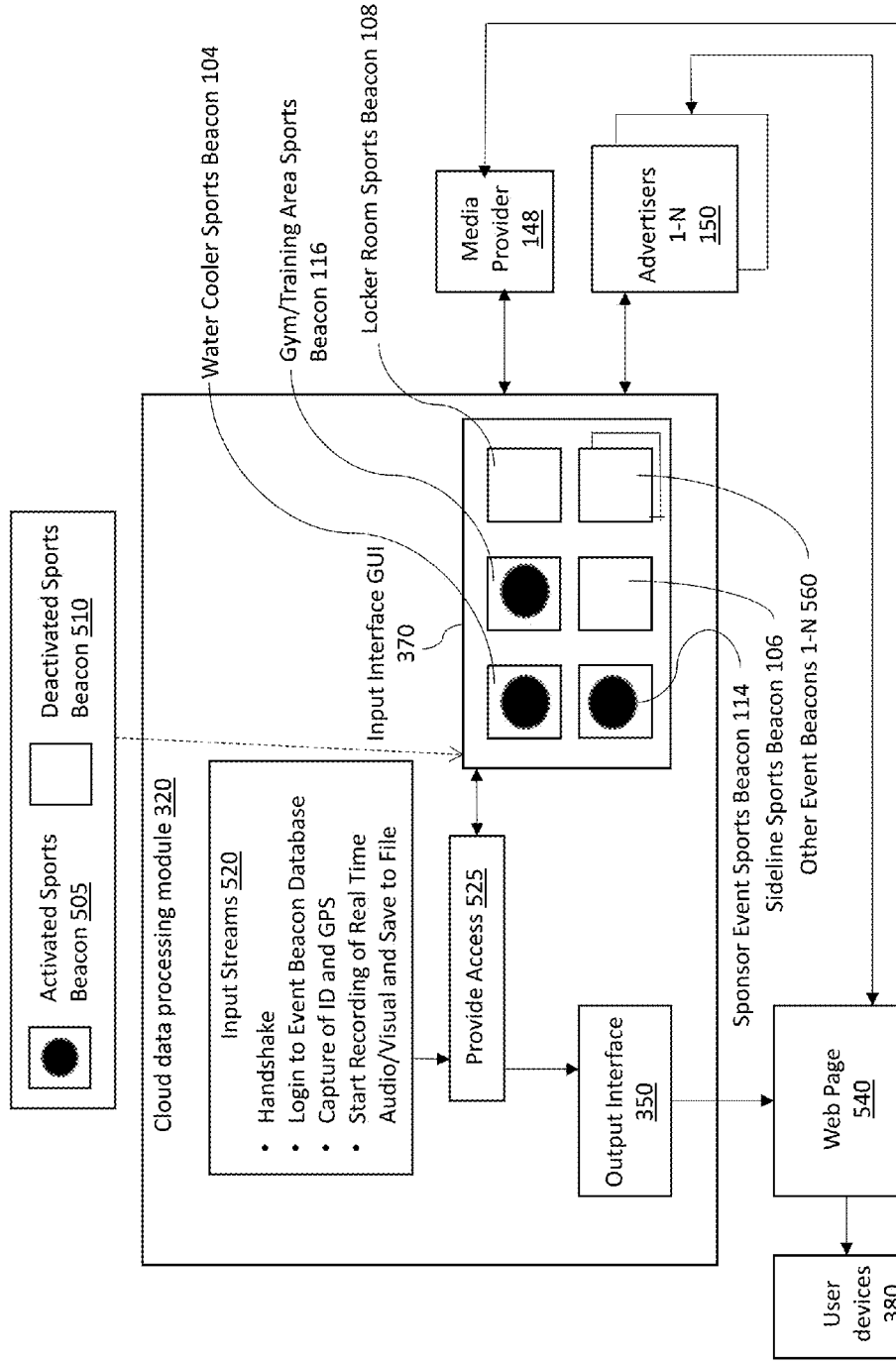
FIG. 5 illustrates an exemplary cloud data processing module.

FIG. 5 illustrates an exemplary cloud data processing module.

In particular, the cloud data processing module 320 illustrates an input stream operations 520, which describes receiving audiovisual data through the Network/internet comm 310 from the event beacons 170. The input stream operations 520 may include a digital "handshake" (e.g., setting communication parameters, may include transfer of security data such as passwords or symmetric/assymetric keys or certificates), login to the event beacon database 360, capture of the beacon ID 250 and GPS data from the GPS comm 260, and recording audiovisual data and outputting it as a file or stream.

The cloud data processing module 320 includes an input interface GUI 370, which in this case is shown as a grid identifying multiple event beacons 170, some of which are activated 505 and some of which are deactivated 510. The input interface GUI 370 may be provided to the media provider 148 and advertisers 150, for example, and can be used to provide access 525 to the input streams of step 520.

The cloud data processing module 320 includes an input interface GUI 350, which may be API-based or may be hosted at a web page 540 (e.g., a public Internet website or a private intranet portal), which may then be used by user devices 380, the media provider 148, or advertisers 150 to be provided access 525 to the input streams of step 520.

Figures 6A, 6B, 6C:
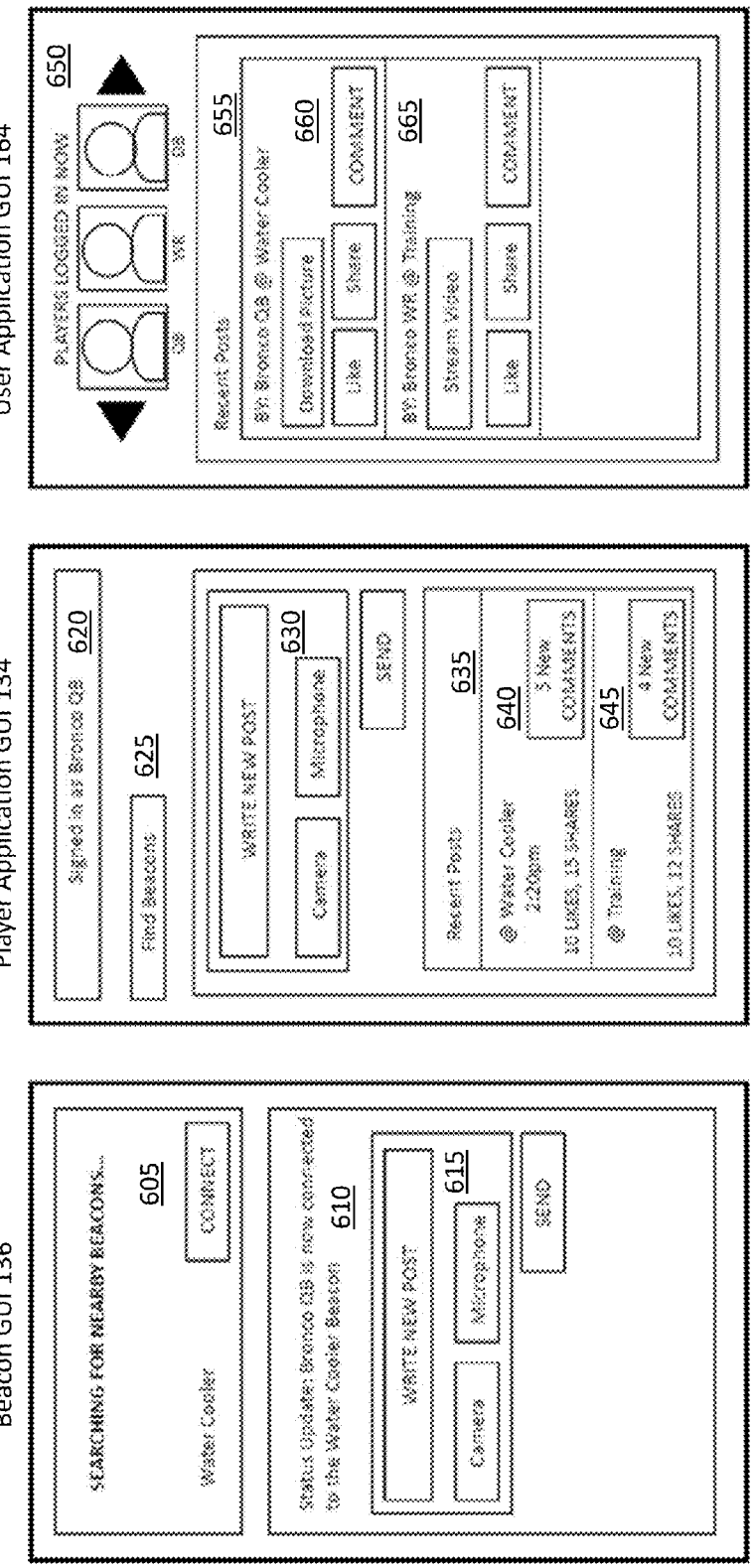
FIG. 6A illustrates an exemplary beacon graphical user interface.
FIG. 6B illustrates an exemplary player application graphical user interface.
FIG. 6C illustrates an exemplary user application graphical user interface.

FIG. 6A illustrates an exemplary beacon graphical user interface.

The beacon GUI 136 of FIG. 6A includes a beacon finding interface 605 that allows a player to locate and identify event beacons 170 that they would wish to connect to (e.g., to obtain direct access to their audiovisual data or indirect access through the cloud content system 144. The beacon GUI 136 may be used by a player remote device 130 to connect to one or more such event beacons 170. The beacon GUI 136 of FIG. 6A includes a status update 610 indicating that the connection to the water cooler beacon 104 was successful, and a "write new post" GUI element allowing the player to write a new post (or add camera and/or microphone inputs from the player remote device 130 or from one or more event beacons 170) to be published through a social media platform 122.

FIG. 6B illustrates an exemplary player application graphical user interface. The player application GUI 134 may be used by the player remote device 130. The player application GUI 134 may identify a login status 620 and may include a beacon GUI 625 element allowing the player to find additional event beacons 170.

The player application GUI 134 may also include a "write new post" GUI element allowing the player to write a new post (or add camera and/or microphone inputs from the player remote device 130 or from one or more event beacons 170) to be published through a social media platform 122.

The player application GUI 134 may also include a "recent posts" GUI 635 identifying recent social media posts by the logged in player to the social media platforms(s) 122. For example, a "water cooler" post 640 is identified and "training" post 645 is identified.

FIG. 6C illustrates an exemplary user application graphical user interface. The user application GUI 164 may be used by the user remote device 150. The user application GUI 164 may identify a login status 650 of multiple sports players (e.g., whether or not each of the identified players are logged in to the player application GUI 134).

The user application GUI 164 may also include a "recent posts" GUI 655 identifying recent social media posts by a number of identified sports players (e.g., those shown to be logged in 650 and/or others as well) to the social media platforms(s) 122. For example, a "Bronco QB @ water cooler" post 660 is identified and "Bronco WR @ training" post 665 is identified. Users may like, share, or comment on this content directly from the user application GUI 164.

Figure 7:
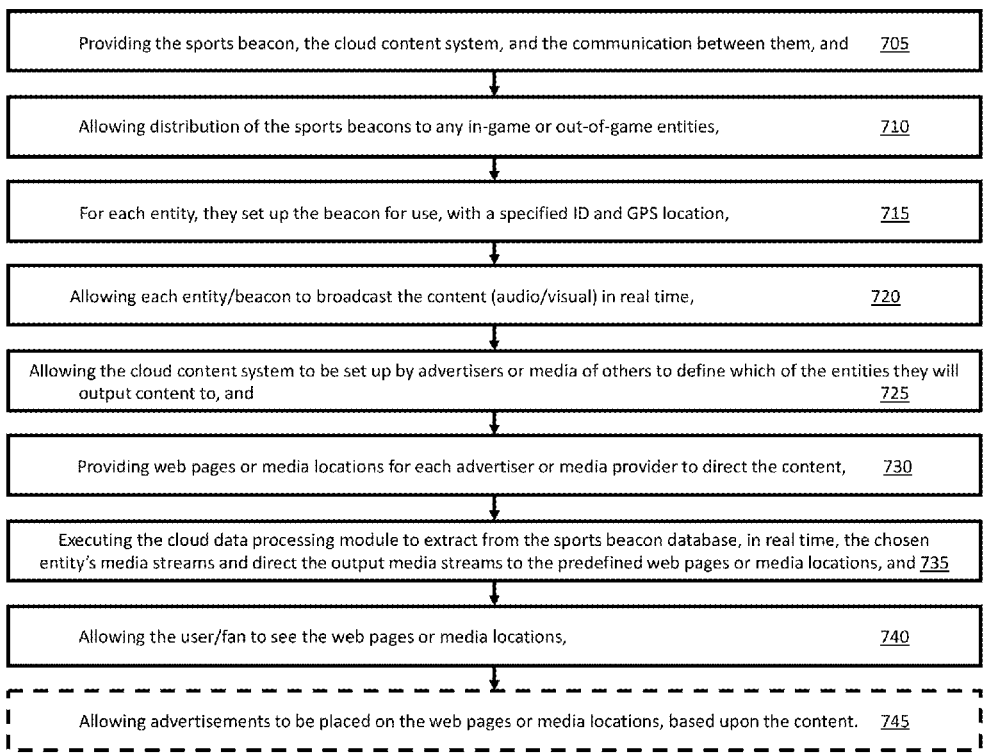
FIG. 7 illustrates an exemplary overall method of the present invention as described herein.

FIG. 7 illustrates an exemplary overall method of the present invention as described herein.

The method may include, at step 705, providing the sports beacon 200, the cloud content system/provider 144, and the communication between them 100.

The method may include, at step 710, allowing distribution of the sports beacons 170 to any in-game 102 or out-of-game 112 entities.

The method may include, at step 715, for each entity, setting up the beacon 200 for use, with a specified ID 250 and GPS location (via GPS comm 260).

The method may include, at step 720, allowing each entity/beacon 200 to broadcast the content (audio/visual) in real time.

The method may include, at step 725, allowing the cloud content system 144 to be set up by advertisers 150 or media 148 of others to define which of the entities they will output content to.

The method may include, at step 730, providing web pages 540 or media locations for each advertiser 150 or media provider 148 to direct the content.

The method may include, at step 735, executing the cloud data processing module 320 to extract from the sports beacon database 360, in real time, the chosen entity's media streams and direct the output media streams to the predefined web pages 540 or media locations.

The method may include, at step 740, allowing the user/fan to see the web pages 540 or media locations.

The method may optionally include, at step 745, allowing advertisements to be placed on the web pages 540 or media locations, based upon the content.

Figure 8:
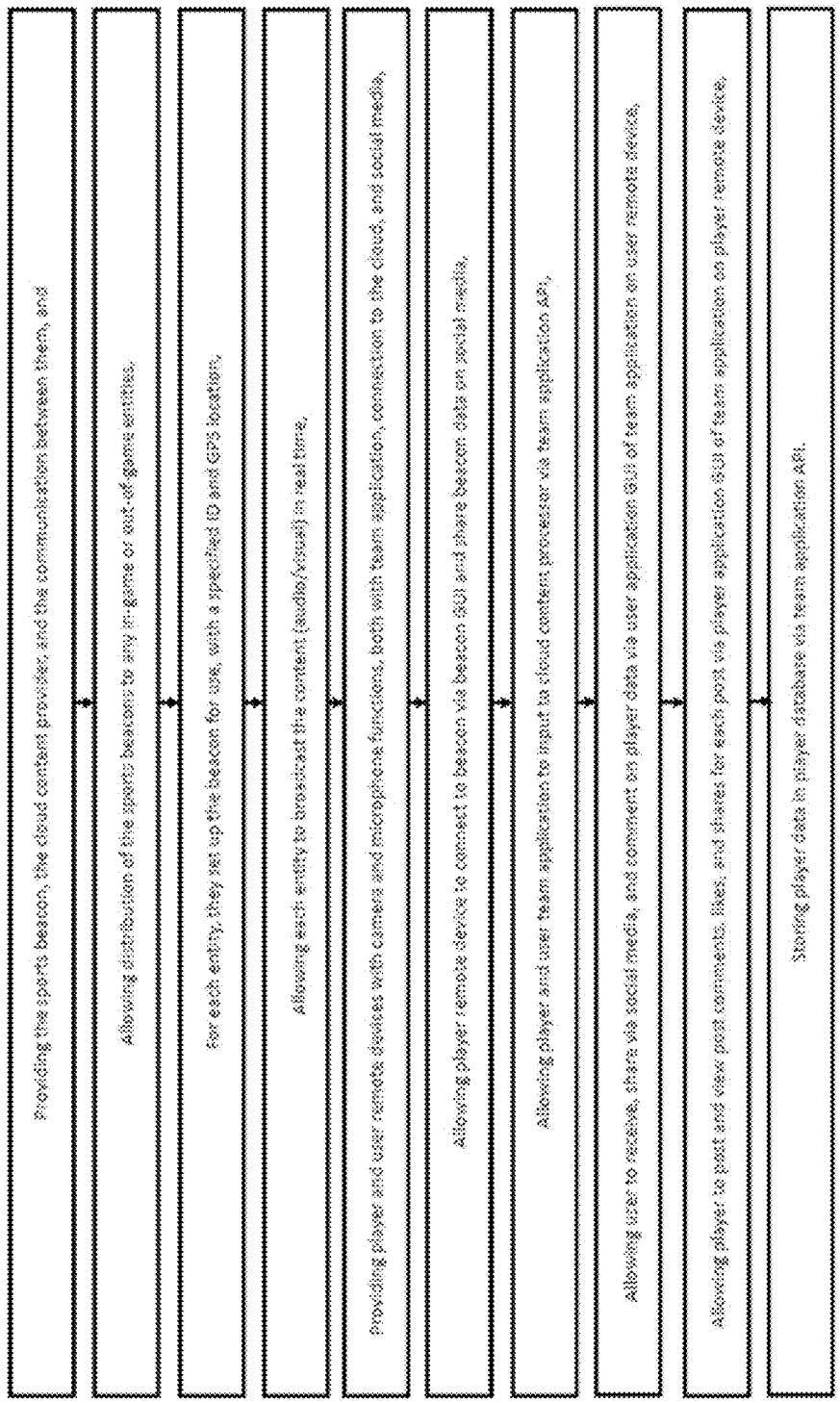
FIG. 8 illustrates an exemplary overall method of the present invention as described herein.

FIG. 8 illustrates an exemplary overall method of the present invention as described herein.

The method may include, at step 805, providing the sports beacon 200, the cloud content system/provider 144, and the communication between them 100.

The method may include, at step 810, allowing distribution of the sports beacons 170 to any in-game 102 or out-of-game 112 entities.

The method may include, at step 815, for each entity, setting up the beacon 200 for use, with a specified ID 250 and GPS location (via GPS comm 260).

The method may include, at step 820, allowing each entity/beacon 200 to broadcast the content (audio/visual) in real time.

The method may include, at step 825, providing player remote devices 130 and user remote devices 150 with camera 140 and microphone 138 functions (both may have these), both with team applications 132/162, connection to the cloud/network/internet 100, and social media platforms 122.

The method may include, at step 830, allowing player remote device 130 to connect to event beacons 170 via beacon GUI 136 and share beacon data on social media platforms 122.

The method may include, at step 835, allowing the player team application 132 and user team application 162 to input to cloud content system 144 via team application API 340.

The method may include, at step 840, allowing user to receive, share via social media platforms 122, and comment on player data via user application GUI 164 of user team application 162 on user remote device 160.

The method may include, at step 845, allowing player to post and view post comments, likes, and shares for each post via player application GUI 134 of player team application 132 on player remote device 130.

The method may include, at step 850, storing player data in player database 330 via team application API 340.

Figure 9:
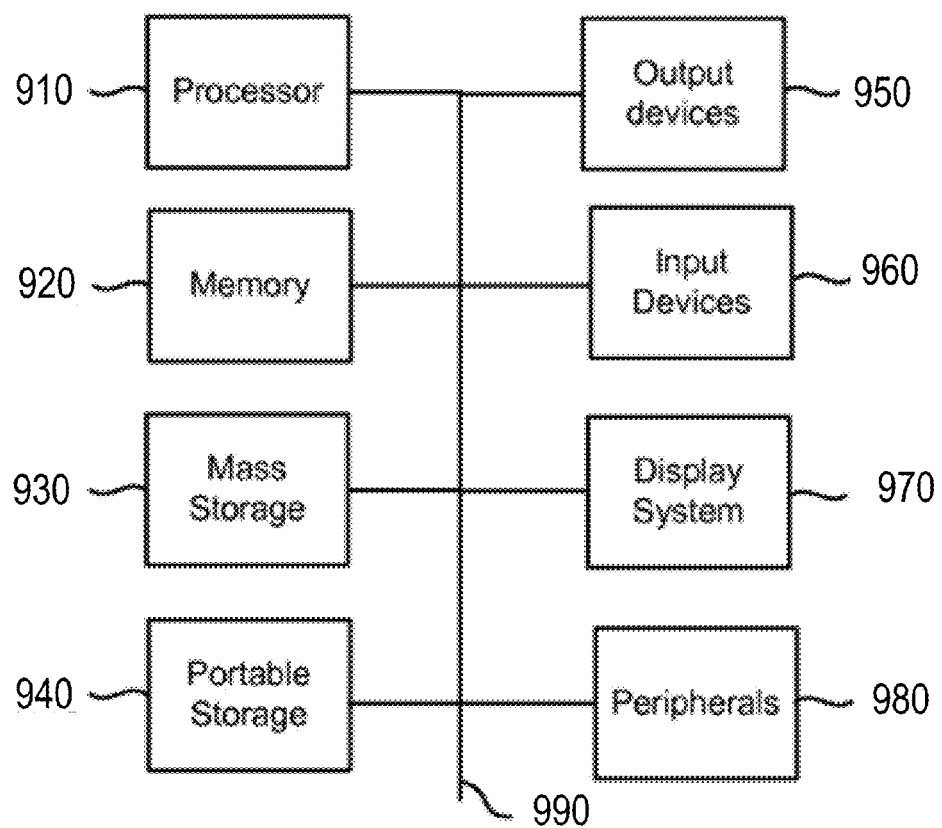
FIG. 9 is a block diagram of an exemplary computing device that may be used to implement an embodiment of the present invention.

FIG. 9 illustrates an exemplary computing system 900 that may be used to implement an embodiment of the present invention. The computing system 900 of FIG. 9 includes one or more processors 910 and memory 910. Main memory 910 stores, in part, instructions and data for execution by processor 910. Main memory 910 can store the executable code when in operation. The system 900 of FIG. 9 further includes a mass storage device 930, portable storage medium drive(s) 940, output devices 950, user input devices 960, a graphics display 970, and peripheral devices 980.

The components shown in FIG. 9 are depicted as being connected via a single bus 990. However, the components may be connected through one or more data transport means. For example, processor unit 910 and main memory 910 may be connected via a local microprocessor bus, and the mass storage device 930, peripheral device(s) 980, portable storage device 940, and display system 970 may be connected via one or more input/output (I/O) buses.

Mass storage device 930, which may be implemented with a magnetic disk drive or an optical disk drive, is a non-volatile storage device for storing data and instructions for use by processor unit 910. Mass storage device 930 can store the system software for implementing embodiments of the present invention for purposes of loading that software into main memory 910.

Portable storage device 940 operates in conjunction with a portable non-volatile storage medium, such as a floppy disk, compact disk or Digital video disc, to input and output data and code to and from the computer system 900 of FIG. 9. The system software for implementing embodiments of the present invention may be stored on such a portable medium and input to the computer system 900 via the portable storage device 940.

Input devices 960 provide a portion of a user interface. Input devices 960 may include an alpha-numeric keypad, such as a keyboard, for inputting alpha-numeric and other information, or a pointing device, such as a mouse, a trackball, stylus, or cursor direction keys. Additionally, the system 900 as shown in FIG. 9 includes output devices 950. Examples of suitable output devices include speakers, printers, network interfaces, and monitors.

Display system 970 may include a liquid crystal display (LCD) or other suitable display device. Display system 970 receives textual and graphical information, and processes the information for output to the display device.

Peripherals 980 may include any type of computer support device to add additional functionality to the computer system. For example, peripheral device(s) 980 may include a modem or a router.

The components contained in the computer system 900 of FIG. 9 are those typically found in computer systems that may be suitable for use with embodiments of the present invention and are intended to represent a broad category of such computer components that are well known in the art. Thus, the computer system 900 of FIG. 9 can be a personal computer, hand held computing device, telephone, mobile computing device, workstation, server, minicomputer, mainframe computer, or any other computing device. The computer can also include different bus configurations, networked platforms, multi-processor platforms, etc. Various operating systems can be used including Unix, Linux, Windows, Macintosh OS, Palm OS, Android, iOS, and other suitable operating systems.

While various flow diagrams provided and described above may show a particular order of operations performed by certain embodiments of the invention, it should be understood that such order is exemplary (e.g., alternative embodiments can perform the operations in a different order, combine certain operations, overlap certain operations, etc.).

The foregoing detailed description of the technology herein has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claim.

What is claimed is:

1. A method for event-based content collection, the method comprising:
   receiving an audiovisual data file from a beacon device at a location within a venue, the audiovisual data file recorded by a combination of cameras, microphones, and environmental sensors around the beacon device, wherein a plurality of other beacon devices are each situated in another location within the venue, and wherein audiovisual data files from each beacon device include a unique identification number associated with the respective beacon device;
   incorporating into the received audiovisual data file:
   a geographical location of the beacon device,
   time data identifying a time associated with the recording of the audiovisual data file, and environmental sensor data from the one or more environmental sensors at the beacon device, wherein the environmental sensor data includes at least one of temperature, humidity, air pollution, allergens, wind, and altitude;

generating a database entry in an event beacon database, wherein the database entry includes at least the audiovisual data file into which the unique identification number, location data, the time data, and the environmental sensor data has been incorporated; and supplying access to at least a subset of the database entries from the event beacon database to a viewer device, wherein the subset of database entries includes the generated database entry and at least one other database entry associated with another audiovisual data file, and wherein the subset is edited to be viewable via a social media platform prior to transmission to the viewer device.

2. The method of claim 1, wherein the geographical location of the beacon device is determined by the beacon device based on one or more communications between the beacon device and one or more global positioning system (GPS) satellites.

3. The method of claim 1, wherein access to the at least subset of the event beacon database is supplied to the viewer through an application programming interface that allows for filtering or editing.

4. The method of claim 1, wherein access to the at least subset of the event beacon database is supplied to the viewer device through one of a public internet website or a private intranet network portal.

5. The method of claim 1, further comprising parsing the audiovisual data file to recognize and identify a person portrayed within the audiovisual data file.

6. The method of claim 5, further comprising:
generating a player database entry in a player database, the player database entry including at least the audiovisual data file, identified person portrayed in the audiovisual data file, and the time data; and
supplying access to at least a subset of the player database to a second viewer device.

7. The method of claim 5, wherein the person portrayed in the audiovisual data file is recognized and identified as a player, and wherein parsing the audiovisual data file includes recognizing that the audiovisual data file includes one or more images of a number associated with the player.

8. The method of claim 5, wherein the person portrayed in the audiovisual data file is recognized and identified as a player, and wherein parsing the audiovisual data file includes recognizing that the audiovisual data file includes one or more images of text associated with the player.

9. The method of claim 5, wherein the person portrayed in the audiovisual data file is recognized and identified as a player, and wherein parsing the audiovisual data file includes recognizing that the audiovisual data file includes one or more facial images associated with the player.

10. The method of claim 1, wherein the one or more environmental sensors is selected from the group comprising thermometer, air humidity sensor, air pollution sensor, air pollen/allergen sensor, wind sensor, and altitude sensor.

11. The method of claim 1, further comprising parsing the audiovisual data file to recognize speech recorded within the audiovisual data file.

12. The method of claim 11, wherein filtering the audiovisual data comprises detecting one or more predefined swearwords recorded within the parsed audiovisual data file.

13. The method of claim 12, wherein editing the audiovisual data comprises bleeping out one or more predefined swearwords detected within the parsed audiovisual data file.

14. A system for event-based content collection, the system comprising:
a plurality of beacon devices, wherein each beacon device located at a different location within a venue and each associated with: an audiovisual collector device that includes a combination of cameras, microphones, and environmental sensors around the respective beacon device; and
a cloud content system, wherein execution of instructions stored in a memory of the cloud content system by a processor of the cloud content system:
receives an audiovisual data file from each of the beacon devices, wherein the audiovisual data file includes a unique identification number associated for the respective beacon device;
incorporates into the received audiovisual data file:
a geographical location of the respective beacon device,
time data identifying a time associated with the recording of the audiovisual data file by the respective beacon device, and
environmental sensor data from the environmental sensors at the respective beacon device, wherein the environmental sensor data includes at least one of temperature, humidity, air pollution, allergens, wind, and altitude;
generates a database entry in an event beacon database, wherein the database entry includes at least the audiovisual data file into which the unique identification number, location data, the time data, and the environmental sensor data has been incorporated; and
supplies access to at least a subset of the database entries from the event beacon database to a viewer device, wherein the subset of database entries includes the generated database entry and at least one other database entry associated with another audiovisual data file, and wherein the subset is edited to be viewable via a social media platform prior to transmission to the viewer device.

15. The system of claim 14, wherein the geographical location of the beacon device is determined by the beacon device based on one or more communications between the beacon device and one or more global positioning system (GPS) satellites.

16. The method of claim 14, wherein access to the at least subset of the event beacon database is supplied to the viewer through an application programming interface of the cloud content system.

17. The method of claim 14, wherein access to the at least subset of the event beacon database is supplied to the viewer device through one of a public internet website or a private intranet network portal.

18. The system of claim 14, wherein execution of the instructions by the processor of the cloud content system further parses the audiovisual data file to recognize and identify a person portrayed within the audiovisual data file.

19. The system of claim 18, wherein execution of the instructions by the processor of the cloud content system further:
generates a player database entry in a player database, the player database entry including at least the audiovisual data file, identified person portrayed in the audiovisual data file, and the time data; and supplies access to at least a subset of the player database to a second viewer device.

20. A non-transitory computer-readable storage medium, having embodied thereon a program executable by a processor to perform a method for event-based content collection, the method comprising:
receiving an audiovisual data file from a beacon device at a location within a venue, the audiovisual data file recorded by a combination of cameras, microphones, and environmental sensors around the beacon device, wherein a plurality of other beacon devices are each situated in another location within the venue, and wherein audiovisual data files from each beacon device includes a unique identification number associated with the respective beacon device;
incorporating into the received audiovisual data file:
a geographical location of the beacon device,
time data identifying a time associated with the recording of the audiovisual data file, and
environmental sensor data from the one or more environmental sensors at the beacon device, wherein the environmental sensor data includes at least one of temperature, humidity, air pollution, allergens, wind, and altitude;
generating a database entry in an event beacon database, wherein the database entry includes at least the audiovisual data file into which the unique identification number, location data, the time data, and the environmental sensor data has been incorporated; and
supplying access to at least a subset of the database entries from the event beacon database to a viewer device, wherein the subset of database entries includes the generated database entry and at least one other database entry associated with another audiovisual data file, and wherein the subset is edited to be viewable via a social media platform prior to transmission to the viewer device.

* * * * *